US012741575B2

(12) United States Patent
Lee et al.

(10) Patent No.: US 12,741,575 B2
(45) Date of Patent: Sep. 22, 2026

(54) DOOR ARMREST OF VEHICLE

(71) Applicants: HYUNDAI MOTOR COMPANY, Seoul (KR); Kia Corporation, Seoul (KR); SEOYON E-HWA CO., LTD., Anyang-si (KR)

(72) Inventors: Jaeseung Lee, Hwaseong-si (KR); Dowon Kim, Seoul (KR); Jun Tae Park, Seoul (KR)

(73) Assignees: HYUNDAI MOTOR COMPANY, Seoul (KR); Kia Corporation, Seoul (KR); Seoyone-HWA Co., Ltd., Anyang-si (KR)

( * ) Notice: Subject to any disclaimer, the term of this patent is extended or adjusted under 35 U.S.C. 154(b) by 381 days.

(21) Appl. No.: 18/388,937

(22) Filed: Nov. 13, 2023

(65) Prior Publication Data

US 2024/0166108 A1 May 23, 2024

(30) Foreign Application Priority Data

Nov. 21, 2022 (KR) ........................ 10-2022-0156342

(51) Int. Cl.
*B60N 2/75* (2018.01)
*F16D 27/00* (2006.01)

(52) U.S. Cl.
CPC ............... *B60N 2/78* (2018.02); *B60N 2/753* (2018.02); *B60N 2/773* (2018.02); *B60N 2/793* (2018.02); *B60N 2/797* (2018.02); *F16D 27/00* (2013.01)

(58) Field of Classification Search
CPC .......... B60N 2/78; B60N 2/753; B60N 2/797; B60N 2/773; B60N 2/793; F16D 27/00
See application file for complete search history.

(56) References Cited

U.S. PATENT DOCUMENTS

| | | | | |
|---|---|---|---|---|
| 9,108,578 | B2 * | 8/2015 | Choi | B60R 13/0243 |
| 9,233,660 | B1 * | 1/2016 | Farooq | B60R 21/02 |
| 10,457,178 | B2 * | 10/2019 | Shimizu | B60Q 3/217 |
| 2004/0164577 | A1 * | 8/2004 | Shabana | B60N 2/02246 296/1.09 |
| 2024/0253546 | A1 * | 8/2024 | Lee | B60N 2/78 |

* cited by examiner

*Primary Examiner* — Faye M Fleming
(74) *Attorney, Agent, or Firm* — MORGAN, LEWIS & BOCKIUS LLP

(57) ABSTRACT

A door armrest of a vehicle is provided in a door trim that forms a door for opening and closing a door opening formed in a vehicle body, and the door armrest may include an armrest portion on which an occupant's arm is supported and which may be provided on an internal side of the door trim and slides in a longitudinal direction of the vehicle body, and a motor driving portion mounted below the armrest portion, and configured to drive the armrest portion to selectively slide according to an opening or closing signal of the door.

20 Claims, 13 Drawing Sheets

DOOR ARMREST OF VEHICLE

CROSS-REFERENCE TO RELATED APPLICATION

The present application claims priority to Korean Patent Application No. 10-2022-0156342 filed on Nov. 21, 2022, the entire contents of which is incorporated herein for all purposes by this reference.

BACKGROUND OF THE PRESENT DISCLOSURE

Field of the Present Disclosure

The present disclosure relates to a door armrest of a vehicle. More particularly, the present disclosure relates to a door armrest capable of supporting an arm of an Occupant in an Interior of a Vehicle Including a Sliding Door Structure.

DESCRIPTION OF RELATED ART

In general, a vehicle is formed with a cabin room of a predetermined size in which a driver or an accompanying passenger may board, and a cabin room door is provided in a vehicle body to open or close the cabin room.

In the case of a passenger vehicle, the cabin room door includes a front door provided in the front in the longitudinal direction of the vehicle and a rear door provided in the rear in the longitudinal direction of the vehicle, and typically, the front door and the rear door are rotatably provided in the vehicle body, through a hinge.

In the case of a van in which many people may board, the cabin room door may be configured to open or close the cabin room by sliding back and forth in the longitudinal direction of the vehicle.

Typically, the slidable cabin room door of a van moves in one direction (e.g., forward) in the longitudinal direction of the vehicle to close the cabin room while the cabin room door moves in an opposite direction (e.g., backward) in the longitudinal direction of the vehicle to open the cabin room. Compared to a hinged cabin room door, the slidable cabin room door provides advantages in that the space required for opening and closing the door is smaller, and the door opening formed in the vehicle body may be completely opened even in a narrow opening and closing space.

Meanwhile, a door armrest for supporting an arm of an occupant is provided at a door of a vehicle. However, a vehicle having slidable cabin room doors 2 and 3 in a vehicle body 1, as shown in FIG. 1, it is difficult to secure a space occupied by the door armrest on the side of the door 3 to secure the swing gap G. FIG. 2 is an enlarged view of a part 'A' of FIG. 1, which is a hinge coupling part of the vehicle. FIG. 3 is a cross-sectional view taken along line B-B of FIG. 2.

As shown in FIG. 2 and FIG. 3, in the case of a hinged cabin room door, in the space between the door 3 and a luggage trim 5, to avoid interference when the door is opened, conventional armrest longitudinal space is reduced to become smaller longitudinal space, so that the existing armrest length space is reduced.

In the instant case, it is difficult to secure an armrest space for the occupant to support his or her arms, resulting in deterioration in usability.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an active door armrest structure of a vehicle configured for providing an armrest function by sliding according to opening and closing of a hinged cabin room door.

A door armrest of a vehicle is provided in a door trim that forms a door for opening and closing a door opening formed in a vehicle body, and the door armrest may include an armrest portion on which an occupant's arm is supported and which may be provided on an internal side of the door trim and slides in a longitudinal direction of the vehicle body, and a motor driving portion mounted below the armrest portion, and configured to drive the armrest portion to selectively slide according to an opening or closing signal of the door.

The motor driving portion may include a lower rail bracket, a motor disposed on the lower rail bracket, a linear motor guide disposed movable in the longitudinal direction on an upper surface of the lower rail bracket, a rack gear disposed selectively movable in the longitudinal direction on the upper surface of the lower rail bracket, and disposed in parallel to the linear motor guide, and a pinion gear connected to a driveshaft of the motor, protruding upwards from the lower rail bracket, and configured to rotate in engagement with the rack gear, to selectively slide the linear motor guide and the rack gear in the longitudinal direction of the vehicle body.

The linear motor guide may be fixed to the lower rail bracket by a linear motor block fixed to an upper surface of the lower rail bracket.

When the door is closed, the motor may be driven and the pinion gear may be rotated in a first direction so that the armrest portion slides to expand.

When an opening signal of the door is generated, the motor may be driven and the pinion gear may be rotated in a second direction opposite to the first direction so that the armrest portion slides to contract.

The pinion gear may include a first pinion gear connected to the driveshaft of the motor, and a second pinion gear mounted above the first pinion gear and formed as an electromagnet selectively engaged with or disengaged from the first pinion gear depending on application of electric power.

The first pinion gear and the second pinion gear may be disengaged upon releasing of the electric power.

The first pinion gear and the second pinion gear may be disengaged with or disengaged from each other by a clutch which is disposed above the first pinion gear and configured to move upward or downward depending on application of the electric power to the second pinion gear.

The clutch may be formed of a steel material.

The clutch may be coupled to a coupling protrusion formed on an upper surface of the first pinion gear, to be configured for moving upward and downward along the coupling protrusion.

The second pinion gear may include an axial shaft rotatably coupled to a fixture protruding from the upper portion of the lower rail bracket.

The armrest portion may include an armrest internal cover on which a storage box for storing articles and a door switch for generating a door opening signal are provided.

A side portion of an armrest internal cover in the internal side of the door trim may be covered by an armrest plate, and the armrest plate may move along an armrest rail plate disposed on an external side of the door trim in the longitudinal direction of the vehicle body.

The armrest rail plate may be provided on the external side of the door trim through an armrest guide bracket fixed to an external surface of the door trim.

A position detecting sensor configured to detect a position of the armrest portion and an ECU configured to control movement of the armrest portion may be provided on an external side of the door trim.

An upper rail bracket may be provided below the armrest portion, and the upper rail bracket may be in contact with an upper portion of the motor driving portion so that the armrest portion slides in the longitudinal direction of the vehicle body.

An armrest external cover configured to cover a side portion of the armrest portion and a pull handle cover configured to cover the armrest external cover may be coupled to a vehicle body internal side of the armrest portion, and the armrest external cover and the armrest portion may be coupled by an armrest internal bracket.

According to an exemplary embodiment of the present disclosure, by providing an active door armrest structure to a hinged cabin room door by use of a motor to be capable of serving as an armrest when door is closed and sliding to a position without an interference when the door is opened, a door armrest space for supporting the occupant's arm may be secured.

Furthermore, for securing the door armrest space and removing the interference occurring while the slidable opening and closing of with door, a separate apparatus is not required and thus cost reduction and layout degree of freedom may be enhanced.

Furthermore, by use of an electromagnet gear, when a vehicle accident occurs or when the power of the vehicle is released, the door armrest may be manually slid and thus usability may be improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 10A and FIG. 10B illustrates a state of a pinion gear when applying and releasing of power of a motor driving portion of a door armrest of a vehicle according to another exemplary embodiment of the present disclosure.

Figure 1:
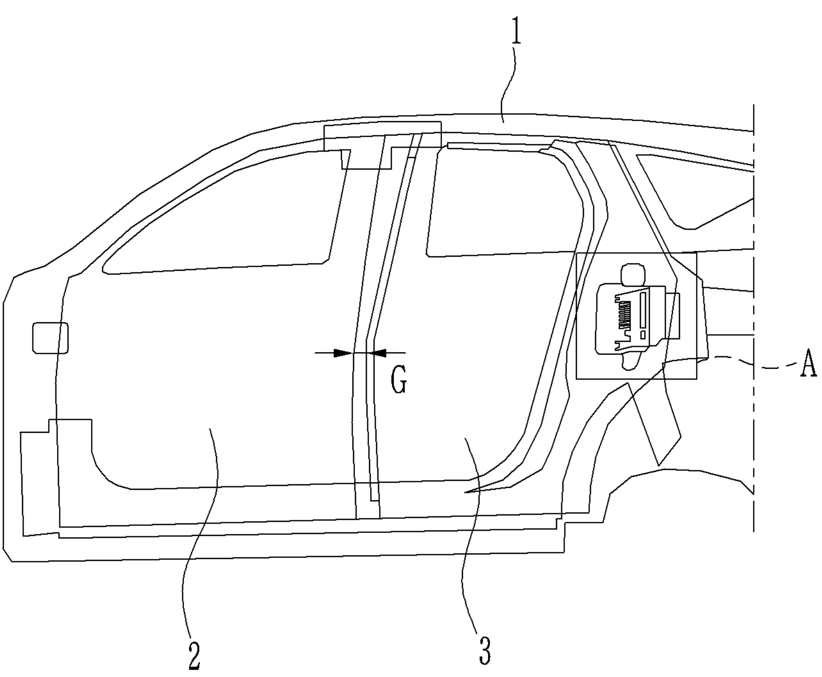
FIG. 1 is a side view of a vehicle having a conventional slidable cabin room door.
Figure 2:
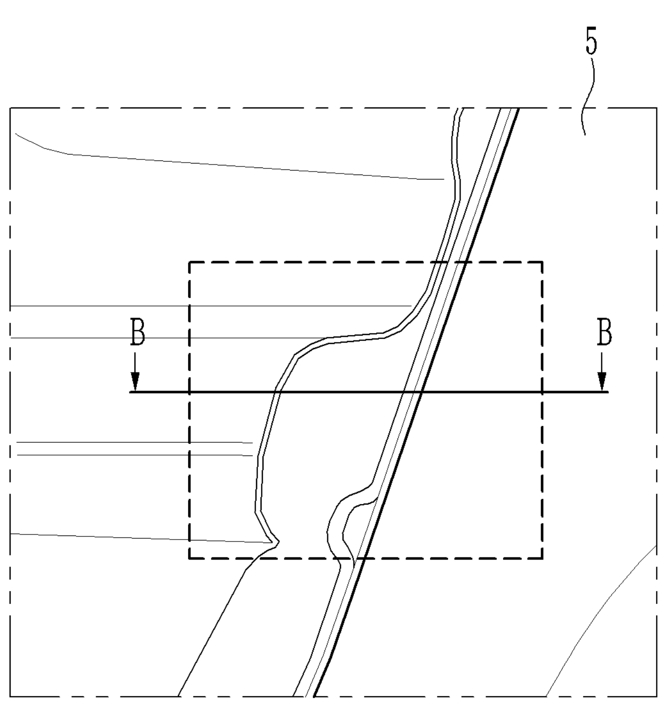
FIG. 2 is an enlarged view of a part 'A' of FIG. 1, which is a hinge coupling part of the vehicle.
Figure 3:
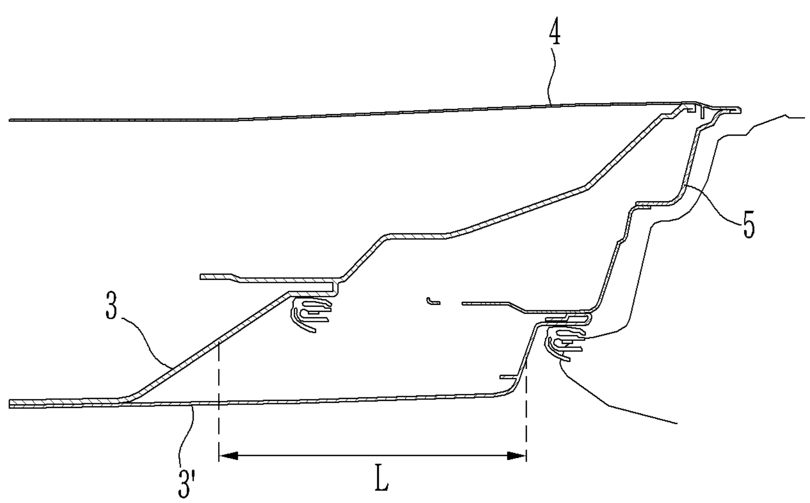
FIG. 3 is a cross-sectional view taken along line B-B of FIG. 2.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Exemplary embodiments of the present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

Furthermore, with embodiments of the present disclosure, detailed description is made of as to the constituent elements in various exemplary embodiments with reference to the relevant drawings by use of the same reference numerals for the same constituent elements, while only the constituent elements different from those related to the various exemplary embodiments are described in other exemplary embodiments of the present disclosure.

The drawings are schematic, and are not illustrated in accordance with a scale. Relative dimensions and ratios of portions in the drawings are illustrated to be exaggerated or reduced in size for clarity and convenience, and the dimensions are just examples and are not limiting.

Furthermore, like structures, elements, or components illustrated in two or more drawings use same reference numerals for showing similar features. It will be understood that when an element such as a layer, film, region, or substrate is referred to as being "on" another element, it may be directly on the other element or intervening elements may also be present.

The exemplary embodiment of the present disclosure shows various exemplary embodiments of the present disclosure in detail. As a result, various modifications of the drawings will be expected. Therefore, the embodiments are not limited to a specific shape of an illustrated region, but, for example, include a change in the shape in accordance with manufacturing.

Hereinafter, a door armrest of a vehicle according to an exemplary embodiment of the present disclosure is described in detail with reference to the drawings.

Figure 4:
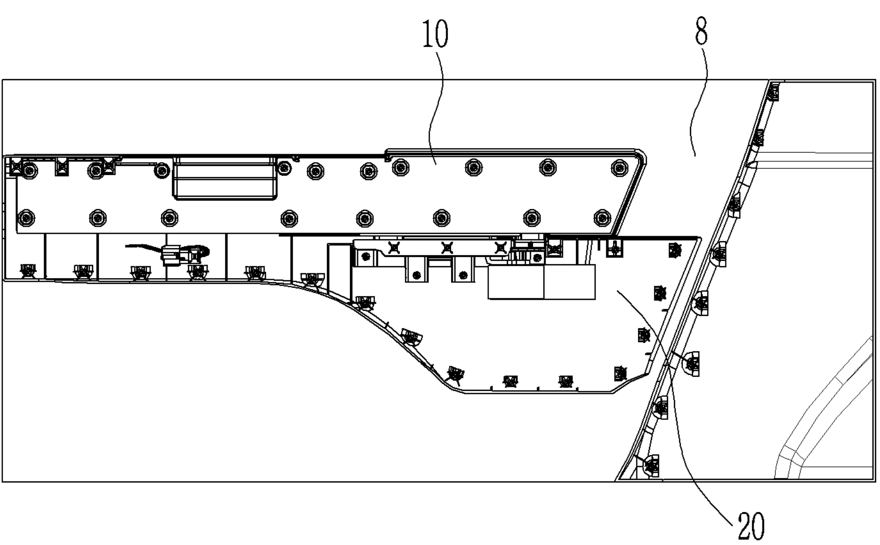
FIG. 4 illustrates a frontal view of a door armrest of a vehicle according to an exemplary embodiment of the present disclosure.
Figure 5:
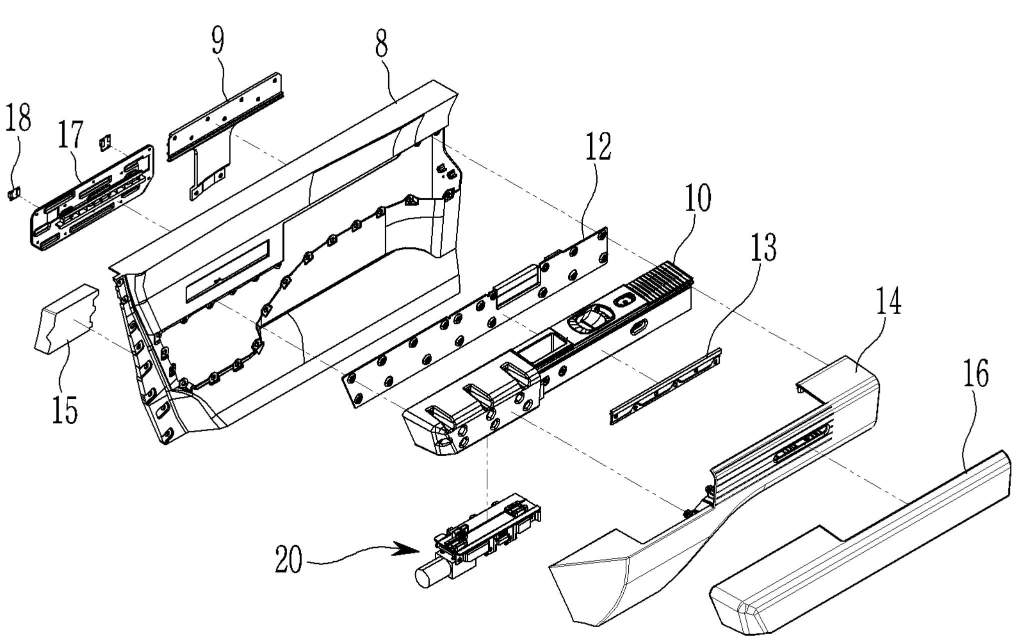
FIG. 5 illustrates an exploded perspective view of a door armrest of a vehicle according to an exemplary embodiment of the present disclosure.

FIG. 4 illustrates a frontal view of a door armrest of a vehicle according to an exemplary embodiment of the present disclosure. FIG. 5 illustrates an exploded perspective view of a door armrest of a vehicle according to an exemplary embodiment of the present disclosure.

Referring to FIG. 4 and FIG. 5, a door armrest of a vehicle according to various exemplary embodiments of the present disclosure may be applied to an internal side of a rear door provided in a rear of the vehicle in a longitudinal direction of the vehicle, and may also be applied to a structure in which the rear door is opened or closed by moving in a vehicle width direction and also sliding in the vehicle length direction. However, a door armrest of a vehicle according to various exemplary embodiments of the present disclosure may also be applied to a front door as well as the rear door. A door armrest of a vehicle according to an exemplary embodiment structure may be provided over a door internal panel forming a door opening and closing a door opening formed in a vehicle body and a door trim 8 covering the door internal panel.

Referring to FIG. 4 and FIG. 5, a door armrest of a vehicle according to an exemplary embodiment structure includes an armrest portion 10, and a motor driving portion 20.

The armrest portion 10 is a portion of which an occupant's arm is rested on an upper surface, and may be provided on an internal side of the door trim 8 to slide in the longitudinal direction of the vehicle body. The motor driving portion 20 is disposed below of the armrest portion 10, and configured to generate a driving force so that the armrest portion 10 slides according to an opening or closing signal of the door.

An armrest plate 12 is provided in a side portion of the armrest portion 10 to cover the armrest portion 10 in an internal side of the door trim 8. The armrest plate 12 slides together with the armrest portion 10, and may move in the longitudinal direction of the vehicle body, along an armrest rail plate 17 provided in an external side the door trim 8. The armrest rail plate 17 may be provided in an external side of the door trim 8 through an armrest guide bracket 9 fixed to an external surface of the door trim 8.

Meanwhile, a position detecting sensor 18 configured to detect a position of the armrest portion 10 and an electronic control unit (ECU) 15 configured to control movement of the armrest portion 10 may be provided in the external side of the door trim 8. The position detecting sensor 18 may be provided on the armrest rail plate 17 to detect a position of the armrest plate 12, and the ECU 15 may be configured to generate a driving torque of the motor driving portion 20 when an opening signal of the door is generated.

Meanwhile, an armrest external cover 14 configured to cover the side portion of the armrest portion 10 and a pull handle cover 16 configured to cover the armrest external cover 14 are sequentially coupled to a vehicle body internal side of the armrest portion 10, and the armrest external cover 14 and the armrest portion 10 may be coupled to each other by an armrest internal bracket 13 interposed therebetween.

Figure 6:
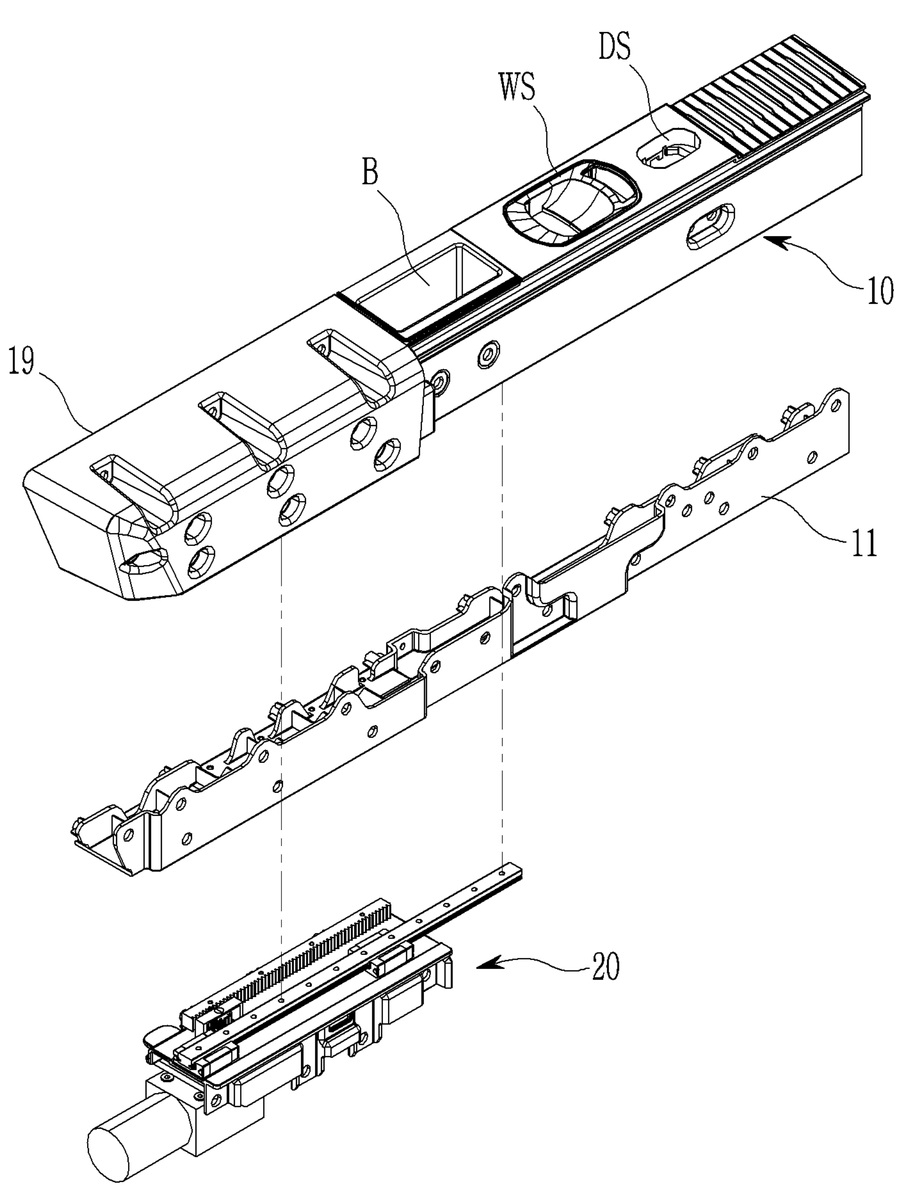
FIG. 6 illustrates a coupling relationship between an armrest portion and a motor driving portion of a door armrest of a vehicle according to an exemplary embodiment of the present disclosure.

FIG. 6 illustrates a coupling relationship between an armrest portion and a motor driving portion of a door armrest of a vehicle according to an exemplary embodiment of the present disclosure.

As shown in FIG. 6, an external surface of the armrest portion 10 may be formed as an armrest internal cover 19 which an occupant's arm may directly contact, and a storage box B for storing articles, a window switch WS for generating a window opening signal, and a door switch DS for generating a door opening signal may be provided on an upper surface of the armrest internal cover 19.

An upper rail bracket 11 is provided below of the armrest portion 10, and the upper rail bracket 11 may be in contact with an upper portion of the motor driving portion 20 so that the armrest portion 10 may slide in the longitudinal direction of the vehicle body. A lower surface of the upper rail bracket 11 is fixed to a linear motor guide 23 and a rack gear 24 of the motor driving portion 20 so that the upper rail bracket 11 and the armrest portion 10 may slide according to movement of the linear motor guide 23 and the rack gear 24 when an actuator including a motor 22 is driven.

Figure 7:
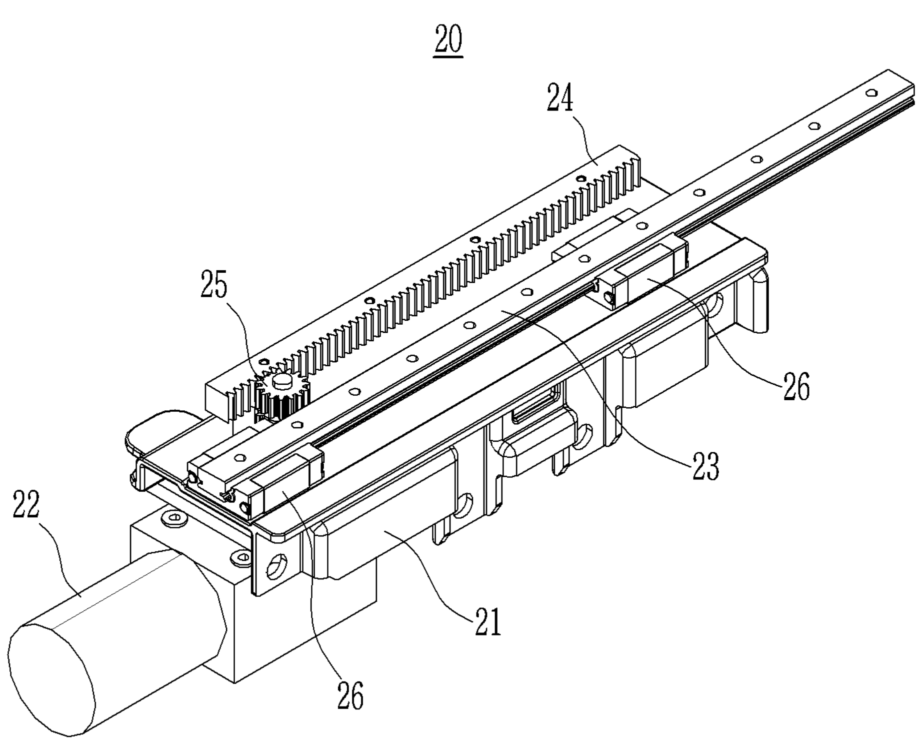
FIG. 7 illustrates a motor driving portion of a door armrest of a vehicle according to an exemplary embodiment of the present disclosure.

FIG. 7 illustrates a motor driving portion of a door armrest of a vehicle according to an exemplary embodiment of the present disclosure.

Referring to FIG. 7, the motor driving portion 20 includes a lower rail bracket 21, the motor 22 disposed in a lower portion of the lower rail bracket 21, the linear motor guide 23 disposed movable in the longitudinal direction on an upper surface of the lower rail bracket 21, the rack gear 24 disposed movable in the longitudinal direction on the upper surface of the lower rail bracket 21 and disposed in parallel to the linear motor guide 23, and a pinion gear 25 coaxially connected to a driveshaft of the motor 22 and configured to rotate in engagement with the rack gear 24.

The lower rail bracket 21 and the motor driving portion 20 may be fixed to the vehicle body, and the linear motor guide 23 and the rack gear 24 may move in the longitudinal direction of the vehicle body when the pinion gear 25 rotates. The motor 22 is driven when the door opening signal is generated, and the pinion gear 25 is coaxially connected to the driveshaft of the motor 22. The pinion gear 25 protrudes upwards from the lower rail bracket 21 to be engaged with the rack gear 24, and configured to rotate by the rotation of the driveshaft of the motor 22, to slide the rack gear 24 and the linear motor guide 23 in the longitudinal direction of the vehicle body.

The linear motor guide 23 may be fixed to the upper surface of the lower rail bracket 21 by a linear motor block 26 fixed to an upper surface of a lower rail bracket 21. The linear motor block 26 may be provided in a pair in the longitudinal direction of the lower rail bracket 21 to guide a moving path of the linear motor guide 23.

Figure 8A:
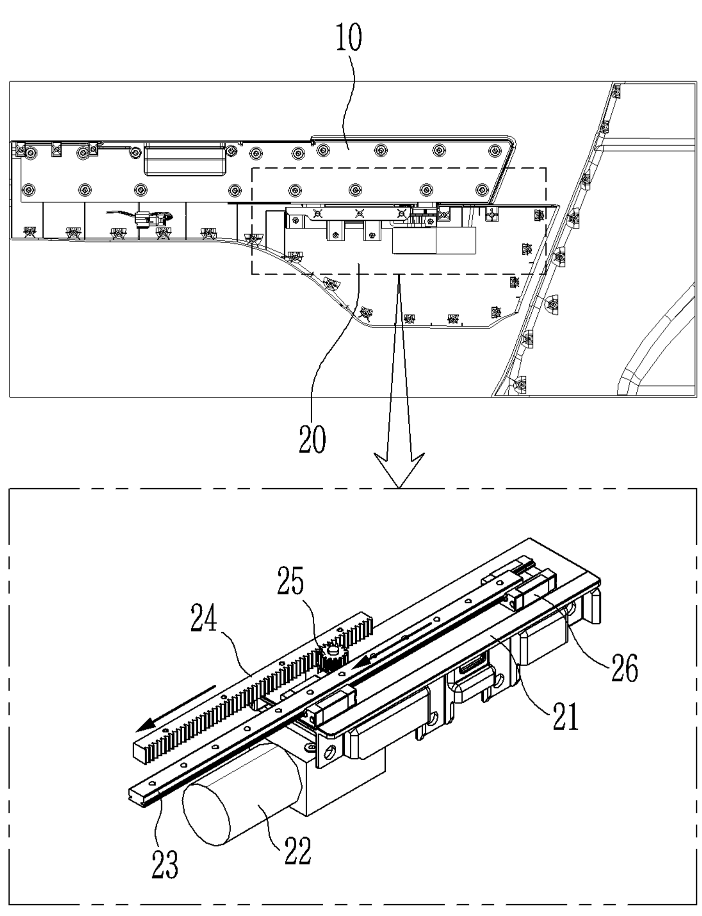
FIG. 8A and FIG. 8B illustrates a state of motor driving portion during a door opening and closing process of a door armrest of a vehicle according to an exemplary embodiment of the present disclosure.
Figure 8B:
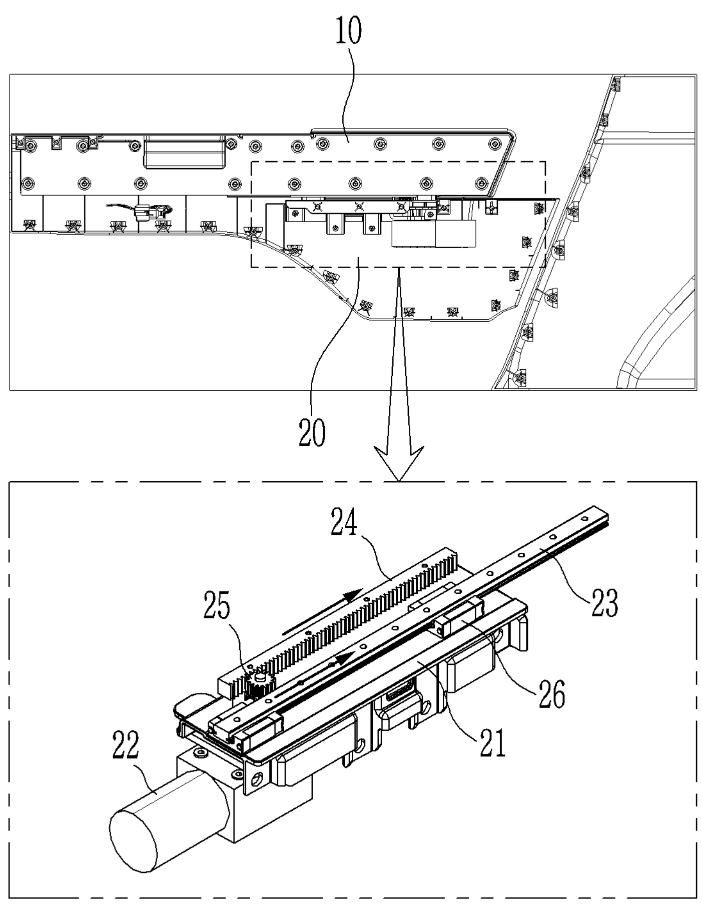

FIG. 8A and FIG. 8B illustrates a state of motor driving portion during a door opening and closing processes of a door armrest of a vehicle according to an exemplary embodiment of the present disclosure.

As shown in FIG. 8A, when closing of the door is detected, the motor 22 is driven, and the pinion gear 25 connected to the driveshaft of the motor 22 is rotated in a first direction so that the linear motor guide 23 and the rack gear 24 engaged with the pinion gear 25 slide toward the front of the vehicle body. The armrest portion 10 connected to the rack gear 24 and the linear motor guide 23 slides to expand, for resting on of the occupant's arm.

Furthermore, as shown in FIG. 8B, when the opening signal of the door is generated, the motor 22 is driven, and the pinion gear 25 is rotated in a second direction opposite to the first direction so that the rack gear 24 and the linear motor guide 23 slide toward the rear of the vehicle body. Therefore, the armrest portion 10 may slide to be contracted so that the armrest does not interfere with opening of the door when the door is opened.

Figure 9:
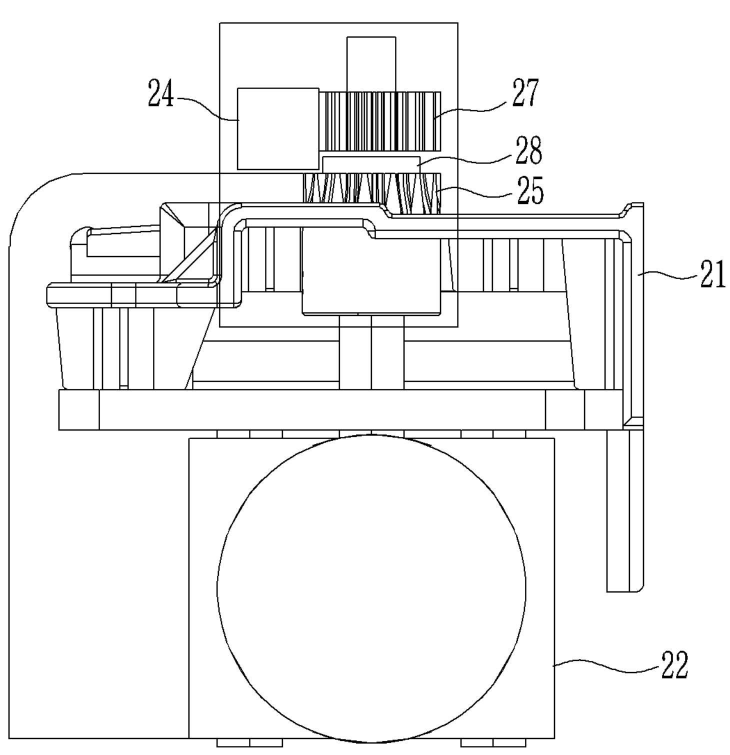
FIG. 9 is a front view showing a motor driving portion of a door armrest of a vehicle according to another exemplary embodiment of the present disclosure.
Figures 10A, 10B:
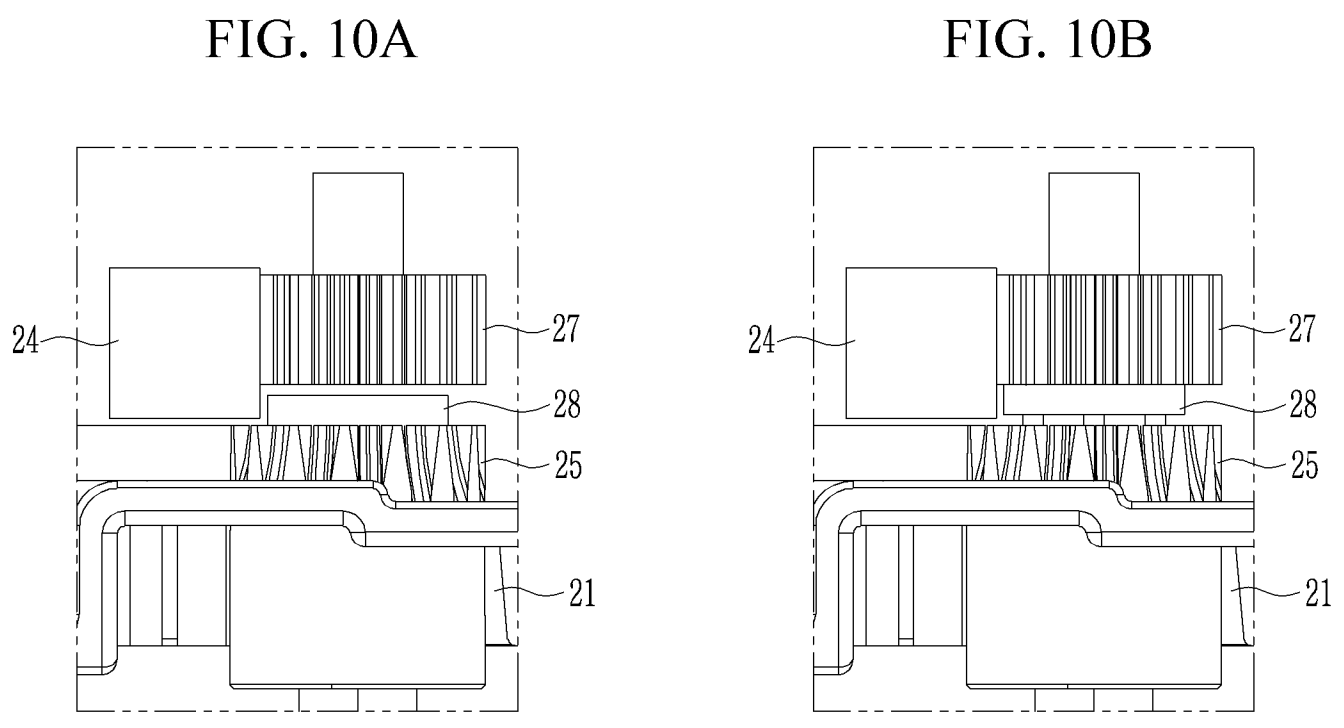
Figure 11:
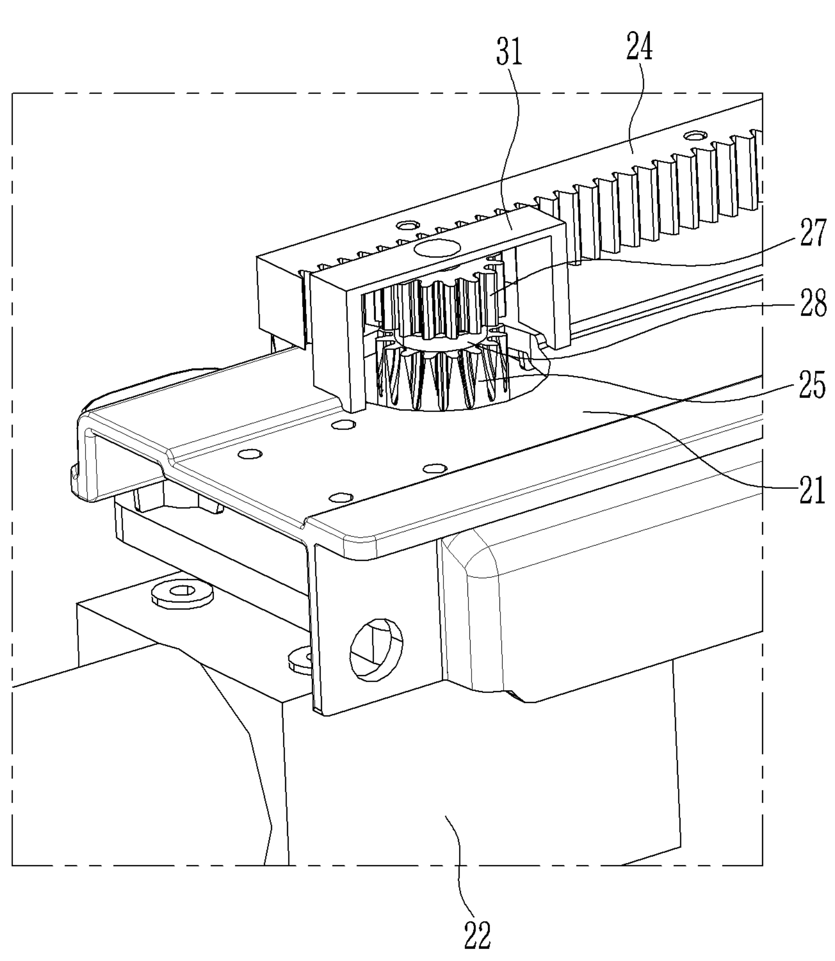
FIG. 11 is a perspective view showing a motor driving portion of a door armrest of a vehicle according to another exemplary embodiment of the present disclosure.

FIG. 9 is a front view showing a motor driving portion of a door armrest of a vehicle according to another exemplary embodiment of the present disclosure. FIG. 10 illustrates a state of a pinion gear when applying and releasing of power of a motor driving portion of a door armrest of a vehicle according to another exemplary embodiment of the present disclosure. FIG. 11 is a perspective view showing a motor driving portion of a door armrest of a vehicle according to another exemplary embodiment of the present disclosure.

Referring to FIG. 9, FIG. 10 and FIG. 11, a pinion gear according to another exemplary embodiment of the present disclosure may include a first pinion gear 25 coaxially connected to the driveshaft of the motor 22 and a second pinion gear 27 disposed on above the first pinion gear 25. The second pinion gear 27 may include an axial shaft rotatably coupled to a fixture 31 protruding from the upper portion of the lower rail bracket 21. The fixture 31 may include a pair of vertical members extending upwards from the upper surface of the lower rail bracket 21 and a horizontal member that horizontally connecting the pair of vertical members, e.g., at a top, and an axial shaft of the second pinion gear 27 may be rotatably coupled to the horizontal member.

The second pinion gear 27 may be formed as an electromagnet, and may be engaged with or disengaged from the first pinion gear 25 depending on application of electric power to the second pinion gear 27. The first pinion gear 25 and the second pinion gear 27 may be disengaged when the electric power is released.

A clutch 28 configured to move upward and downward depending on application of electric power may be provided above the first pinion gear 25. As shown in FIG. 10A, when the electric power is released, the clutch 28 is retracted downward to the first pinion gear 25 and thereby the contact with the second pinion gear 27 may be released. Furthermore, as shown in FIG. 10B, when the electric power is applied, the clutch 28 moves upwards from the first pinion gear 25, and thereby may be in contact with the second pinion gear 27. According to such a structure, when a vehicle accident occurs or when the power of the vehicle is released, the connection between the second pinion gear 27 and the motor driving portion 20 may be released, and therefore, the door armrest may be manually slid without operating the motor driving portion 20.

Figure 12:
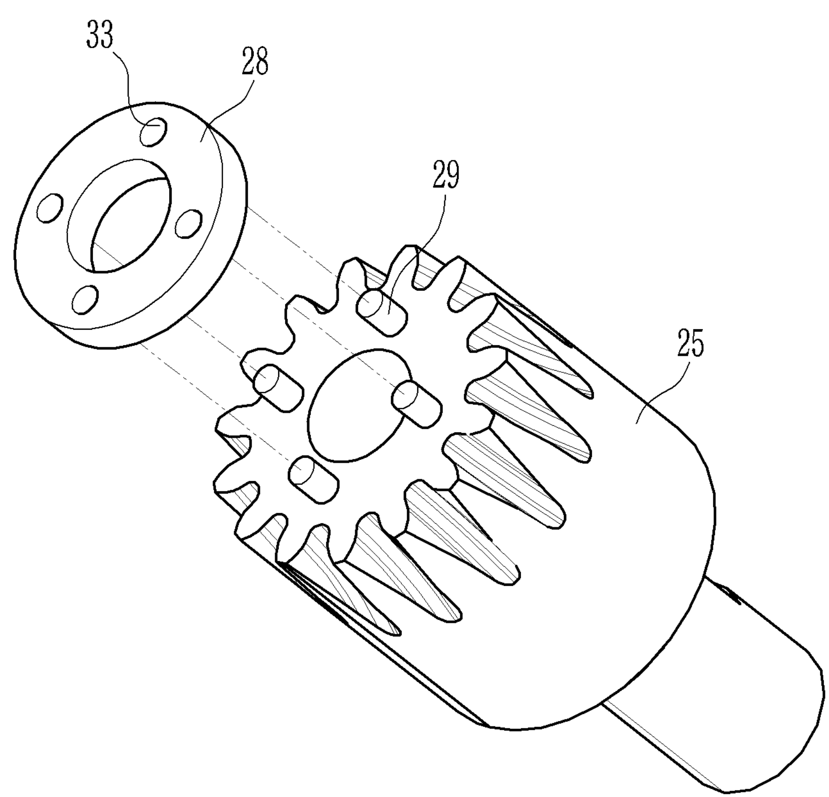
FIG. 12 illustrates a coupling relationship between first pinion gear and clutch of a motor driving portion of a door armrest of a vehicle according to another exemplary embodiment of the present disclosure.

FIG. 12 illustrates a coupling relationship between first pinion gear and clutch of a motor driving portion of a door armrest of a vehicle according to another exemplary embodiment of the present disclosure.

As shown in FIG. 12, a coupling protrusion 29 is formed to protrude from an upper surface of the first pinion gear 25, and the clutch 28 includes at least a coupling hole 33 and the at least a coupling hole 33 of the clutch 28 may be coupled to the coupling protrusion 29 so that the clutch 28 is movable upward and downward along the coupling protrusion 29. The clutch 28 may be formed of steel material, and may be in a form of a tube that correspond to a cross-sectional shape of the first pinion gear 25.

In an exemplary embodiment of the present invention, the first pinion gear 25 may be a driveshaft of the motor 22 and the coupling protrusion 29 is formed on a surface of the driveshaft of the motor 22 such that the at least a coupling hole 33 of the clutch 28 may be selectively coupled to the coupling protrusion 29.

Accordingly, according to an exemplary embodiment of the present disclosure, by providing an active door armrest structure to a hinged cabin room door by use of a motor to be capable of serving as an armrest when door is closed and sliding to a position without an interference when the door is opened, a door armrest space for supporting the occupant's arm may be secured.

Furthermore, for securing the door armrest space and removing the interference occurring while the slidable opening and closing of with door, a separate apparatus is not required and thus cost reduction and layout degree of freedom may be enhanced.

Furthermore, by use of an electromagnet gear, when a vehicle accident occurs or when the power of the vehicle is released, the door armrest may be manually slid and thus usability may be improved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as “unit”, “module”, etc. included in the specification mean units for processing at least one function or operation, which may be implemented by hardware, software, or a combination thereof.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In the present specification, unless stated otherwise, a singular expression includes a plural expression unless the context clearly indicates otherwise.

In exemplary embodiments of the present disclosure, “at least one of A and B” may refer to “at least one of A or B” or “at least one of combinations of at least one of A and B”. Furthermore, “one or more of A and B” may refer to “one or more of A or B” or “one or more of combinations of one or more of A and B”.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door armrest apparatus of a vehicle, provided in a door trim that forms a door for opening and closing a door opening formed in a vehicle body, the door armrest apparatus comprising:

an armrest portion which is provided on an internal side of the door trim and configured to slide in a longitudinal direction of the vehicle body; and a motor driving portion mounted below the armrest portion, and configured to drive the armrest portion to selectively slide according to an opening or closing signal of the door, wherein the motor driving portion comprises a motor, a rack gear, and a pinion gear coupled to a driveshaft of the motor and configured to rotate in engagement with the rack gear to cause linear translation of the rack gear, thereby sliding the armrest portion in the longitudinal direction of the vehicle body.

2. The door armrest apparatus of claim 1, wherein the motor driving portion further includes:

a lower rail bracket, wherein the motor is disposed on the lower rail bracket; and a linear motor guide disposed movable in the longitudinal direction on an upper surface of the lower rail bracket, wherein the rack gear is disposed to be selectively movable in the longitudinal direction on the upper surface of the lower rail bracket, and disposed in parallel to the linear motor guide; and wherein the pinion gear is disposed to protrude upwards from the lower rail bracket, and configured to rotate in engagement with the rack gear, to selectively slide the linear motor guide and the rack gear in the longitudinal direction of the vehicle body.

3. The door armrest apparatus of claim 2, wherein the linear motor guide is fixed to the lower rail bracket by a linear motor block fixed to the upper surface of the lower rail bracket.

4. The door armrest apparatus of claim 2, wherein, in response that the door is closed, the motor is driven and the pinion gear is rotated in a first direction so that the armrest portion slides to expand.

5. The door armrest apparatus of claim 4, wherein, in response that the opening signal of the door is generated, the motor is driven and the pinion gear is rotated in a second direction opposite to the first direction so that the armrest portion slides to contract.

6. The door armrest apparatus of claim 2, wherein the pinion gear includes:

a first pinion gear connected to the driveshaft of the motor; and a second pinion gear mounted above the first pinion gear and formed as an electromagnet wherein the second pinion gear is selectively engaged with or disengaged from the first pinion gear depending on application of electric power to the second pinion gear.

7. The door armrest apparatus of claim 6, wherein the first pinion gear and the second pinion gear are disengaged upon releasing of the electric power.

8. The door armrest apparatus of claim 7, further including a clutch, wherein the first pinion gear and the second pinion gear are engaged with or disengaged from each other by the clutch which is disposed above the first pinion gear and configured to move upward or downward depending on application of the electric power to the second pinion gear.

9. The door armrest apparatus of claim 8, wherein the clutch is formed of a steel material.

10. The door armrest apparatus of claim 8, wherein the clutch is slidably coupled to a coupling protrusion formed on an upper surface of the first pinion gear, to be configured for moving upward or downward along the coupling protrusion.

11. The door armrest apparatus of claim 6, wherein the second pinion gear includes an axial shaft rotatably coupled to a fixture protruding from an upper portion of the lower rail bracket.

12. The door armrest apparatus of claim 2, further including:

a clutch slidably coupled on a driveshaft of the motor, wherein the pinion gear is formed as an electromagnet selectively engaged with or disengaged from the driveshaft of the motor depending on application of electric power to the pinion gear.

13. The door armrest apparatus of claim 11, wherein the clutch is formed of a steel material.

14. The door armrest apparatus of claim 11, wherein a coupling hole of the clutch is slidably coupled to a coupling protrusion formed on an upper surface of the driveshaft, for moving upward or downward along the coupling protrusion.

15. The door armrest apparatus of claim 1, wherein the armrest portion includes an armrest internal cover on which a storage box for storing articles and a door switch for generating the opening signal of the door are provided.

16. The door armrest apparatus of claim 1, wherein a side portion of an armrest internal cover in the internal side of the door trim is covered by an armrest plate, and the armrest plate moves along an armrest rail plate disposed on an external side of the door trim in the longitudinal direction of the vehicle body.

17. The door armrest apparatus of claim 16, wherein the armrest rail plate is provided on the external side of the door trim through an armrest guide bracket fixed to an external surface of the door trim.

18. The door armrest apparatus of claim 1, wherein a position detecting sensor configured to detect a position of the armrest portion and a controller configured to control movement of the armrest portion are provided on an external side of the door trim.

19. The door armrest apparatus of claim 1, wherein an upper rail bracket is provided below the armrest portion, and wherein the upper rail bracket is in contact with an upper portion of the motor driving portion so that the armrest portion slides in the longitudinal direction of the vehicle body.

20. The door armrest apparatus of claim 1, wherein an armrest external cover configured to cover a side portion of the armrest portion and a pull handle cover configured to cover the armrest external cover are coupled to a vehicle body internal side of the armrest portion, and wherein the armrest external cover and the armrest portion are coupled by an armrest internal bracket.

* * * * *